US010374876B2

(12) United States Patent
Willis

(10) Patent No.: US 10,374,876 B2
(45) Date of Patent: Aug. 6, 2019

(54) CONFIGURATION OF SERVER APPARATUS

(71) Applicant: BRITISH TELECOMMUNICATIONS PUBLIC LIMITED COMPANY, London (GB)

(72) Inventor: Peter Willis, London (GB)

(73) Assignee: BRITISH TELECOMMUNICATIONS PUBLIC LIMITED COMPANY, London (GB)

(*) Notice: Subject to any disclaimer, the term of this patent is extended or adjusted under 35 U.S.C. 154(b) by 44 days.

(21) Appl. No.: 15/533,801

(22) PCT Filed: Dec. 2, 2015

(86) PCT No.: PCT/EP2015/078410
§ 371 (c)(1),
(2) Date: Jun. 7, 2017

(87) PCT Pub. No.: WO2016/091690
PCT Pub. Date: Jun. 16, 2016

(65) Prior Publication Data
US 2017/0331681 A1  Nov. 16, 2017

(30) Foreign Application Priority Data

Dec. 11, 2014 (EP) .................... 14275254

(51) Int. Cl.
*G06F 13/00* (2006.01)
*H04L 12/24* (2006.01)
*H04L 29/08* (2006.01)

(52) U.S. Cl.
CPC .......... *H04L 41/0806* (2013.01); *H04L 41/28* (2013.01); *H04L 67/10* (2013.01); *H04L 67/34* (2013.01)

(58) Field of Classification Search
CPC . H04L 41/0806; H04L 41/0809; H04L 67/10; H04L 67/34; H04L 41/28
(Continued)

(56) References Cited

U.S. PATENT DOCUMENTS 7,171,479 B2 * 1/2007 Buchanan ............... H04L 29/06
 709/228
7,269,721 B2 * 9/2007 McCardle ............. G06F 9/4416
 709/220

(Continued)

FOREIGN PATENT DOCUMENTS

WO WO 2007/149670 12/2007
WO 2009/065051 5/2009

OTHER PUBLICATIONS

International Search Report for PCT/EP2015/078410, dated Feb. 5, 2016, 3 pages.

*Primary Examiner* — Kenneth R Coulter
(74) *Attorney, Agent, or Firm* — Nixon & Vanderhye PC

(57) ABSTRACT

A small-form programmable pluggable device 80 is used to establish communication between a configurable "bare-metal" server 50 having no existing configuration software installed, and a provisioning server 60 capable of downloading software to the configurable server 50 to allow the configurable server 50 to be configured to perform a specific function. The pluggable device carries sufficient programming to access the required software 63 and deliver it to the configurable server 50. This allows the configurable server to be delivered to its end-user before configuration, and configuration to be performed by the network operator in situ, but without a site visit, by delivery and plug-in of the small-form device 80, which is typically of a suitable size to be mailed.

18 Claims, 13 Drawing Sheets

(58) Field of Classification Search
USPC .......................................... 709/203, 220–222
See application file for complete search history.

(56) References Cited

U.S. PATENT DOCUMENTS

| | | | |
|---|---|---|---|
| 7,395,359 B2* | 7/2008 | Reister | H04L 41/0809 |
| | | | 709/220 |
| 8,046,450 B1 | 10/2011 | Schloss et al. | |
| 10,031,736 B2* | 7/2018 | Lin | G06F 8/61 |
| 2003/0204603 A1* | 10/2003 | Buchanan | H04L 29/06 |
| | | | 709/228 |
| 2004/0034763 A1* | 2/2004 | McCardle | G06F 9/4416 |
| | | | 713/1 |
| 2004/0081104 A1* | 4/2004 | Pan | G06F 9/4405 |
| | | | 370/254 |
| 2004/0117463 A1* | 6/2004 | Reister | H04L 41/0809 |
| | | | 709/220 |
| 2010/0023600 A1 | 1/2010 | Hill et al. | |
| 2010/0070619 A1 | 3/2010 | Chaganti | |
| 2011/0159842 A1 | 6/2011 | Vander Veen et al. | |
| 2012/0295486 A1 | 11/2012 | Petersen et al. | |
| 2013/0290694 A1 | 10/2013 | Civilini et al. | |
| 2016/0234182 A1* | 8/2016 | Bone | H04W 4/70 |
| 2017/0090896 A1* | 3/2017 | Lin | G06F 8/61 |

\* cited by examiner

CONFIGURATION OF SERVER APPARATUS

This application is the U.S. national phase of International Application No. PCT/EP2015/078410 filed 2 Dec. 2015, which designated the U.S. and claims priority to EP Patent Application No. 14275254.2 filed 11 Dec. 2014, the entire contents of each of which are hereby incorporated by reference.

TECHNICAL FIELD

This invention relates to the provisioning of new or upgraded services within a telecommunications network. In particular it relates to the virtualization of network functions.

BACKGROUND AND SUMMARY

Virtualization replaces bespoke physical network appliances, that typically can only perform a single network function, with software running as virtual appliances on standard servers. This allows consolidation of network resources by operating the services with less hardware, reducing the footprint by running several services on the same hardware instead of having separate bespoke hardware for each function, each requiring space and power. Virtualization also simplifies service provision and makes it more flexible, as once the hardware has been installed, the functions can be installed and configured remotely, without the need for a site visit FIG. 11 illustrates the classical network approach, with separate bespoke hardware installed to provide individual functions 110-111 such as message routing, Content Distribution Node, session border control, Wireless area network operation, Deep Packet Inspection, firewall functions, carrier grade network address translation, testing and monitoring quality of experience (QoE), Serving GPRS support node/Gateway GPRS support node, routing, Broadband Remote Access Server and radio access. FIG. 12 illustrates a virtualised approach in which "virtual appliances" 120 are provided by an Independent Software Vendor (ISV) and downloaded as required for installation or update in standardised servers 130, with associated storage 140 and switching functions 150.

Typically, the delivery of managed network services to customers requires the shipping of a hardware component e.g 100, 101 to the customer's site for each network function required. This can involve multiple independent site visits, depending on the source of the hardware, the timing of upgrades, and other factors. Virtualization only requires one initial site visit to install the server 130, and the network functions software 120 can be installed remotely. A key aspect shown in FIG. 12 is a layer of management software that supports the installation and running of multiple virtual machines or virtual appliances 120 on the servers 130. An essential part of the initial server installation is the installation and activation of this management software layer. It is undesirable to have the installation engineer install this software as it increases the length of time the technician will be on-site, and requires training of the installation engineer.

The IT Industry has developed a standardised method for booting a bare metal server (i.e. a server with absolutely no configuration or operating system pre-installed) using PXE (Pre eXecution Environment), (often pronounced "Pixie"), boot and Dynamic Host Configuration Protocol (DHCP). In most modern servers the Basic Input/Output System (BIOS), that boots a server before it loads the primary operating system, includes sufficient functionality to run PXE. On powering up the client server the BIOS will automatically broadcast a Dynamic Host Configuration Protocol (DHCP) message. This is broadcast because the client server, not yet having been configured, has no information on where to send this message. The server at this point in time only has one piece of information, which is its unique MAC (Ethernet) address that is burned into its Ethernet chip on manufacture. A DHCP server on the Data Centre LAN receives the broadcast and replies with the IP address of the client, plus other information required for networking (e.g. default gateway), the IP address of a Trivial File Transfer Protocol (TFTP) server, and the file name that the client server should download and boot. The file that is booted is the operating system required to run or manage the installation of further applications on the client server.

The above process works well in a secure Data Centre environment but has several issues if it is to be used to boot a bare metal server on an insecure customer site using a third party (potentially insecure) network. In particular, the DHCP server may reside on the customer premise or be part of a third party network service provider and it may not be possible to get this configured to include information about the TFTP server. The service provider may also want to prevent a server, provided by a third party, from instructing the customer premises server to load and boot an unauthorized file.

The service provider may not know the IP addresses assigned to its server in advance, or only one of several IP addresses required by the customer. Multiple IP addresses may be required for:

- an Intelligent Platform Management Interface (IPMI) or "lights out management" (LOM) interface. This is an independent Ethernet port connected to a management sub-system that has a processor independent of the main CPUs in the server, whose purpose is to allow management of the server when the CPU has "crashed".
- the installation software 131—it may desirable to reserve the original IP address to be used solely for the customer's own data traffic, and have a separate one for the installation software. This may be used for updates and reconfiguration as well as the initial installation process
- management of virtual network functions or virtual appliances installed at a future time on the server.
- secure management communications with the server, as TFTP (Trivial File Transfer Protocol) is not inherently secure.

Alternatives to this approach preclude the basic hardware being delivered directly from the manufacturer to the customer, but require the service provider to "stage" the server hardware via its own facilities so it can be pre-configured and customized before being shipped to the customer premises. This requires servers to be built to order, and they cannot be shipped from any local warehouse, which lengthens the amount of time taken to complete the customer order. Configuration at a separate facility operated by the service provider is time consuming and makes the service provider responsible for the shipping, and the complexity of import & export duties, customs delays, project planning, contracting & liaising with remote agents and customers.

Alternatively, configuration at the factory requires all servers to be custom-built by the hardware vendor, which adds customisation costs and delays, and also requires sharing of software intellectual property with the hardware vendor, and divides responsibility for quality control and update management.

Moreover, with either approach, if a server fails it has to be replaced with a similar bespoke custom-built server, which can delay the fix time and increase the cost of repairs.

According to a first aspect of the invention, there is provided a method of installing an application on a configurable server device, the method comprising the steps of:
connecting the server device to a telecommunications network through an intermediate communications interface device configured to be coupled to the server device;
initiating and mediating, from the intermediate communications interface device, a tunneled network connection to a network operating centre
receiving, at the configurable server, configuration data downloaded from a program provisioning server hosted by the network operating centre, and
installing the application by configuring the server device in accordance with the configuration data.

According to a second aspect of the invention, there is provided a communications interface device configured to be connected to a server device and a telecommunications network and to initiate and mediate a tunneled network connection between the server device and a program provisioning server at a remote part of the telecommunications network.

In the preferred embodiments, the intermediate communications interface device is embodied as one or more pluggable devices. Separate applications may be mediated through separate respective pluggable devices, in communication with each other, for example through an Ethernet bridge or a paired wireless connection, preferably using a secure tunneled connection.

In the embodiment to be described, the intermediate communications interface device is configured to transmit boot-up instructions to the configurable server device, and directs an instruction to the program provisioning server to obtain a unique network address specific to the network operating centre. The program provisioning server hosted by the network operating centre may operate on a dynamic host configuration protocol (DHCP), wherein boot files are retrieved by the configurable server from a Trivial File Transfer Protocol (TFTP) Server forming part of the program provisioning server. The boot file may be accessible to a plurality of configurable servers, and be customized to the respective network address of each configurable server.

The communications interface device is preferably arranged to mediate installation and operation of a first function on the server device by connection with a program provisioning server, and to communicate with a second such pluggable device installed on the server device to mediate installation and operation on the server device of a second function from the, or another, program provisioning server.

With this invention any "bare metal" server can be delivered out of a warehouse to provision a new site, or to repair a failed server, reducing costs, and speeding up delivery and repairs. This allows the configurable server to be delivered to its end-user before configuration, and configuration to be performed by the network operator in situ, but without a site visit, by delivery and plug-in of the small-form device 80, which is typically of a suitable size to be mailed.

The embodiment of the invention to be described makes use of "SmartSFPs". An SFP is a "small-form factor pluggable device", that converts a standard electrical network connection into a standard optical connection. A standard SFP is a "dumb" device, but a "smart" one adds additional capabilities to perform diagnostics or operations administration and maintenance of network services.

The invention therefore allows a software application to be installed on a "bare metal" server device (having no pre-installed operating system or configuration) by connecting the server device to a telecommunications network through a SFP (small-form factor pluggable device), the pluggable device being configured to initiate and mediate a tunneled network connection to a network operating centre to allow a dynamic host configuration protocol (DHCP) server hosted by the network operating centre to download configuration data to the bare metal server to install the application. This allows physical installation to be a quick and straightforward process, as the SFP is small enough to be sent through the mail to the location where the bare metal server is to be installed. The software to configure the hardware can then be downloaded once the SFP has established contact with a central server.

This embodiment modifies existing SmartSFP technologies to enable them to be used as a way to deliver a secure method to boot up bare metal servers at the customer premise that can be delivered in the mail without requiring highly skilled technicians at the customer site. Existing methods to boot-up servers over the network are designed for private networks in secure data centres but cannot be safely used over a third party network to boot-up a server shipped to an insecure customer site. This embodiment provides a method to use SmartSFPs to allow secure boot-up of any bare metal server shipped to the customer site using only the standard capabilities of an industry standard x86 BIOS server.

BRIEF DESCRIPTION OF THE DRAWINGS

Embodiments of the invention will now be described, by way of example and with reference to the Figures, in which:

FIG. 11 is an overview of a classical networked system FIG. 12 is an overview of a typical prior art network functions virtualization approach

DETAILED DESCRIPTION OF PRESENT EXAMPLE EMBODIMENTS

Figure 1:
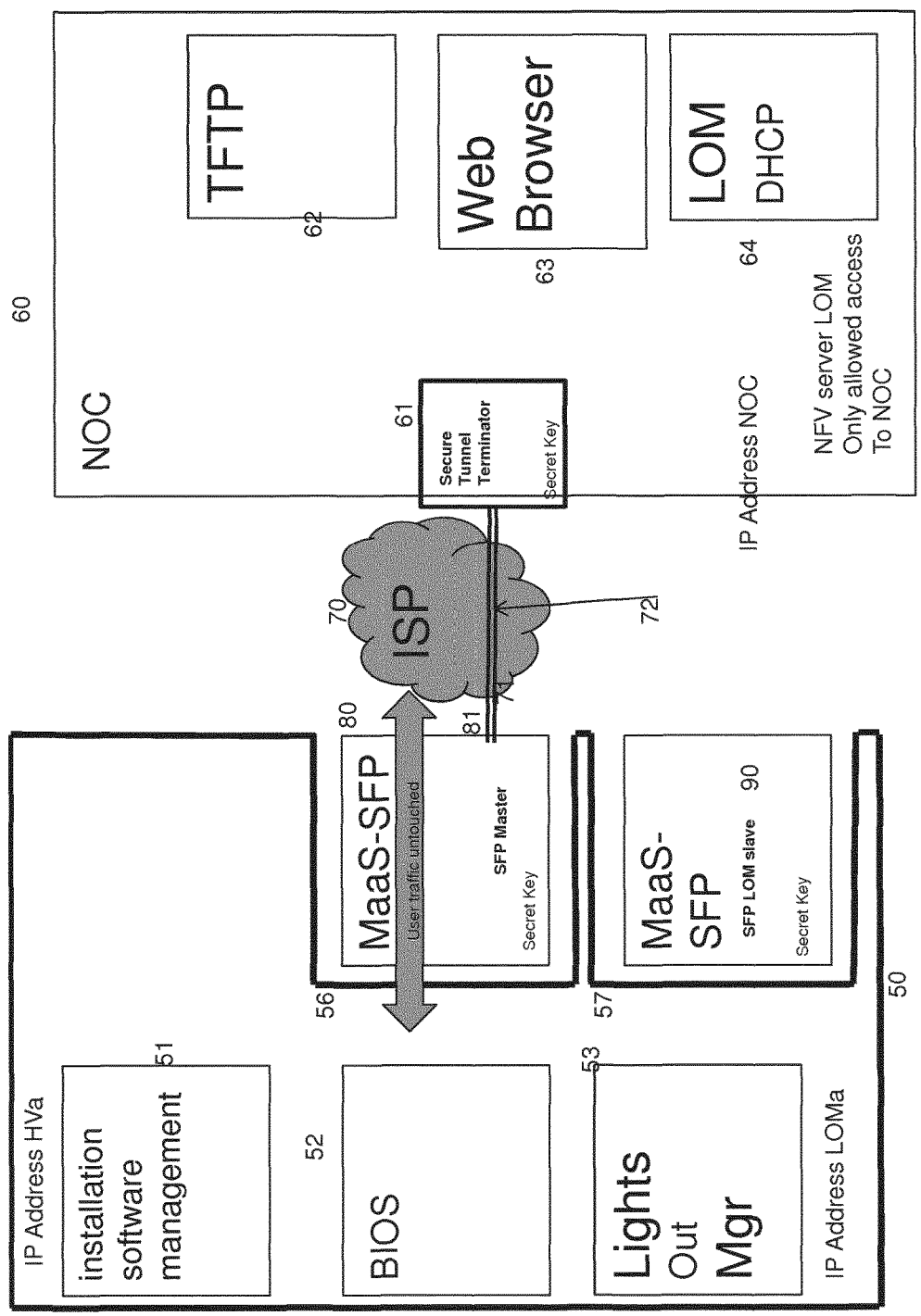
FIG. 1 is an overview of a small-form factor pluggable device according to the invention, and the components with which it co-operates in the performance of the embodiments of the method of the invention

FIG. 1 shows the relevant components which co-operate in the performance of this embodiment of the invention, including the components that are installed during the process. A "bare metal" server 50 is to have a number of applications 51, installed, by downloading from a provisioning server installed at a network operating center 60, through a network 70 and an interface element 80, here embodied as a small-form factor pluggable device.

In this embodiment, the "bare metal" server 50 at the customer premise is initially configured only with standard x86 IT BIOS server functionality 52. However, this example is not limitative, and the invention may also be embodied for use with servers with other functions, for example to provision a secure download to a server in a non-secure location such as a radio-base station site.

Initially an Installation software Management system 51 is to be remotely installed on the server 50. The installation software management system 51 permits further applications 120 to be installed and managed from a remote source 60 Note that in general any software could be installed by this process so the first system to be installed could be any Operating System or bootable application. Key aspects of the Installation software 51 for this invention are that it requires an IP address to allow it to be remotely managed by the network operating center 60, and it can be pre-configured using a bootable file stored on the TFTP server in the Network operating center 60. This means on boot-up the installation software 51 does not need to perform a DHCP (Dynamic Host Configuration Protocol) configuration.

Alternatively, installation software may be arranged to perform a DHCP configuration which would be directed by the SmartSFP to a server hosted at the network operating center 60 to obtain a unique IP address specific to the network operator)

In this example, the primary functions to be installed are network function virtualization systems 120, which provide the network functions to allow the server to operate as part of a network. However, the invention is applicable to any functions that may be desired to be installed.

A "Lights Out manager" (LOM) 53 is a system that allows the remote management of the main server 50 without requiring the main CPU to be operational, for example if it has been powered down or has crashed. The LOM system is arranged so that it should still work in such situations, and can be used to monitor the system and to re-boot the system if the results of that monitoring indicate that should be possible. The LOM 53 is typically installed in the factory like the BIOS 52, but will need configuring to allow the server 50 to be remotely managed from the network operations center 60. A second "slave" SmartSFP 90 facilitates this remote configuration.

The server 50 is to be connected through a data communications network 70 such as the Internet to a DHCP server 39 operated by an internet service provider (ISP). This ISP may be the operator of the network operations center 60 but may be a third party. Consequently, in general the IP address returned by the DHCP server 39 will be unknown to the network operating center 60 in advance.

In order to install these applications 51, on the "bare metal" server 50, a SmartSFP pluggable device 80 and the server 50 are delivered to the required location. These can be delivered independently. The server 50 can be delivered from a manufacturer without requiring installation by a technician with any training in server configuration, and only requires connection to an electrical power supply. The pluggable device 80 is typically small enough to be sent in the mail.

The pluggable device 80 is used to securely "boot-up" the bare metal server 50. It will be referred to herein as a "Metal as a Service" SmartSFP (MaaS-SFP). MaaS is an IT industry term used to refer to the processes used to install and manage operating systems and applications on a bare metal server. The Master MaaS-SFP 80 plugs into an SFP socket 56 on the motherboard, mezzanine or network interface card (NIC) of the server 50.

The Maas-SFP 80 can be electrically powered from the SFP socket 56 (part of the SFP standard). The socket side of an SFP is always electrical. The LAN port 81 on the MaaS-SFP 80 can be optical or electrical (Ethernet), depending on the nature of the communications connection 71 to the network 70.

If the server 50 does not have an SFP socket 56, the MaaS-SFP 80 can be installed by plugging in to a standard copper Ethernet interface on the server 50, power being supplied as Power Over Ethernet from the Server's NIC or via a plug into a USB. Depending on the Server BIOS capabilities it may be possible to implement the invention as a USB stick which, although using a USB interface, appears as an Ethernet interface.

The SFP Master 80 is pre-configured (burned-in the hardware) with a secret key, and the IP address of a termination 61 of a secure tunnel 72 through the network 70 to the network operating center 60, It may also be programmed with the IP addresses of a network-based TFTP server 62, and a lights out manager server 64, and the filename of software to be used for booting up.

There may be advantages in providing all MaaS-SFPs 80 with the same security key as this can minimise production costs, and simplify the provision of spares and replacements of faulty devices. The key can only be used to provide a secure tunnel to the network operating center and thus duplication can be tolerated, provided that only the network operator has the ability to decode it.

A further function may be provided by a second application on a slave MaaS-SFP 90 as a separate pluggable device plugging into an LOM Ethernet port 57 on the server, to operate as an interface for the "lights Out manager 53". If the LOM ethernet port is not configured to take SFPs, the LOM Slave 90 may be provided as an Ethernet electrical (UTP RJ45) to electrical "dongle" which will need to be powered by power Over Ethernet, a USB port, or an external power supply. Alternatively, in the future server operating systems may support a USB port as a LOM port.

In the Network Operations Center 60, a Secure Tunnel Terminator 61 terminates the secure tunnel 72 from the MaaS-SFP 80. The secure tunnel terminator 61 is arranged so that it can manage communications through several secure tunnels, connected to different devices of the kind described above, each plugged in to a respective bare metal server. It may use public-private key pairs or symmetrical private keys, using any known secure IP tunneling technology.

The Secure Tunnel 72 protects the management traffic between the customer site 50 and the Network operations center 60 from inspection and change. It allows the network operator to use its own unique IP addresses independently, and invisible to third party network providers. All communications between the installation software manager server 51 and the network operations center 60 through the MaaS-SFP 80 are made through this secure tunnel 72.

If the customer site is connected to a secure network e.g. MPLS IP VPN service, the secure tunnel need not be used.

A Trivial File Transfer Protocol (TFTP) Server 62 stores the boot files that the server 50 requests via the Trivial File Transfer Protocol. The same boot file may be used by all servers, 50 in the network and customized to its own network address on boot-up by each server, using DHCP. Alternatively a unique file may be stored in the TFTP server 62 for each installation software manger 51 to be installed. A third possibility is for the TFTP server 62 to be configured to create a unique file per server 50 at the time of request i.e it combines the common boot-file with specific configuration information (from a table listing unique configuration details per customer) at DHCP request time.

A Web Browser 63 is used to manage the server hardware via the Lights out manager 53, or the installation software 51, and other applications installed by the installation software.

A lights-out management configuration server 64 in the network operations center 60 is used to transmit unique IP addresses to the LOM 53 and individual virtual applications 51, 120 etc on the user-end server 50.

If the SmartSFP 80 is not itself capable of modifying DHCP packets returned from the internet service provider's DHCP 39, then the MaaS-SFP 80 forwards the ISP's DHCP response to a proxy Server 65 for modification. The modification process will insert the server address of the TFTP 62, and the boot file name to be used, and then returns the packet to the MaaS-SFP 80 for onward forwarding to the server BIOS 52. This method only requires the SmartSFP 80 to implement simple packet filtering rules rather than the more complex packet rewriting capabilities.

Figure 2:
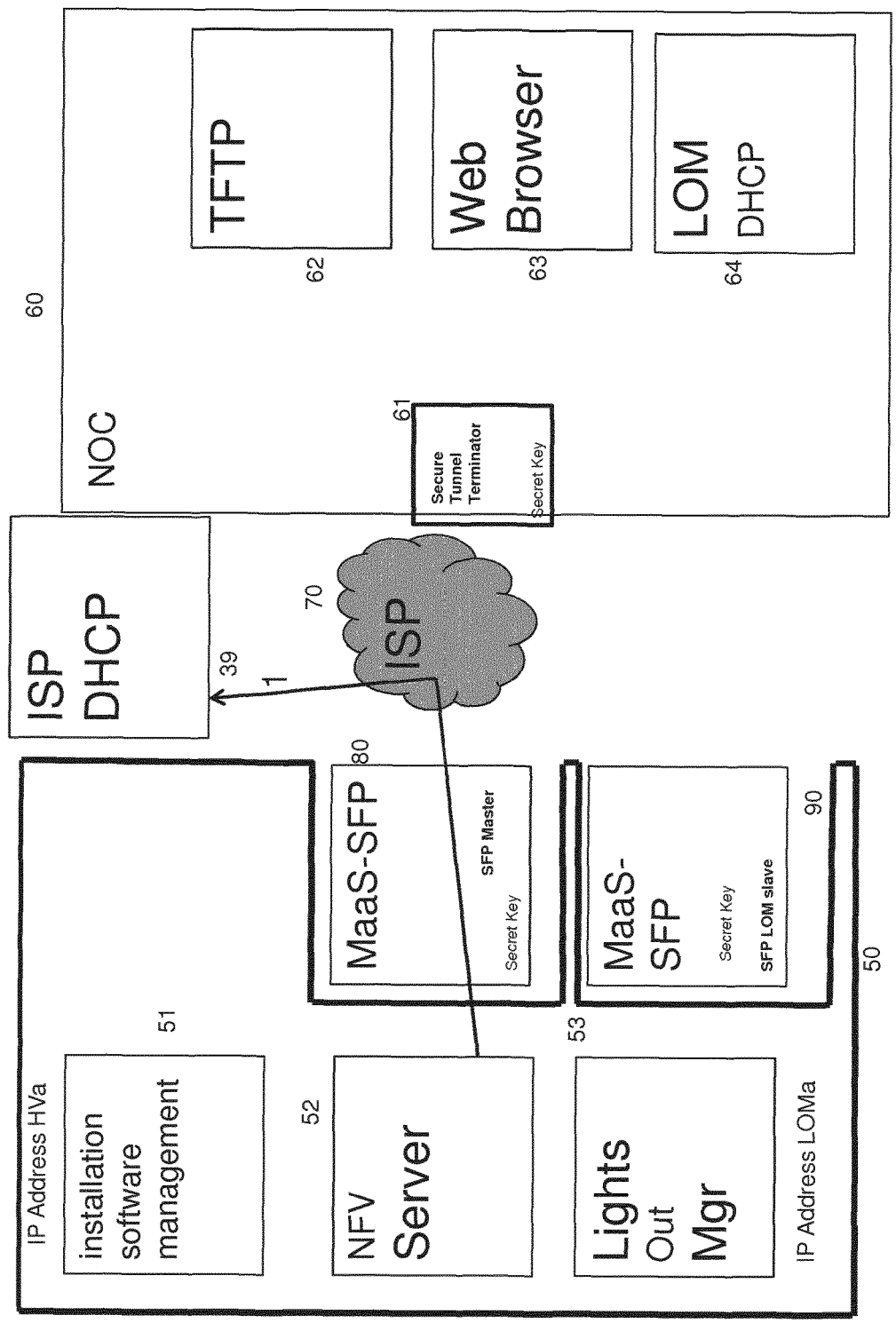
FIGS. 2 to 6 illustrate the various steps in the process of configuring a "bare metal" server in a process according to the invention

FIGS. 2 to 9 show the message flow sequences that take place in operation of this embodiment. Some alternative steps are also shown in FIGS. 3A/3B and FIG. 10:

As shown in FIG. 2, after the pluggable MaaS-SFP device 80 is been installed, the server 50 boots up its BIOS 52 and uses its Pre eXecution Environment (PXE) to broadcast a Dynamic Host Configuration Protocol (DHCP) request packet, which is received by the ISP's DHCP server 39—step 1.

Figure 3:
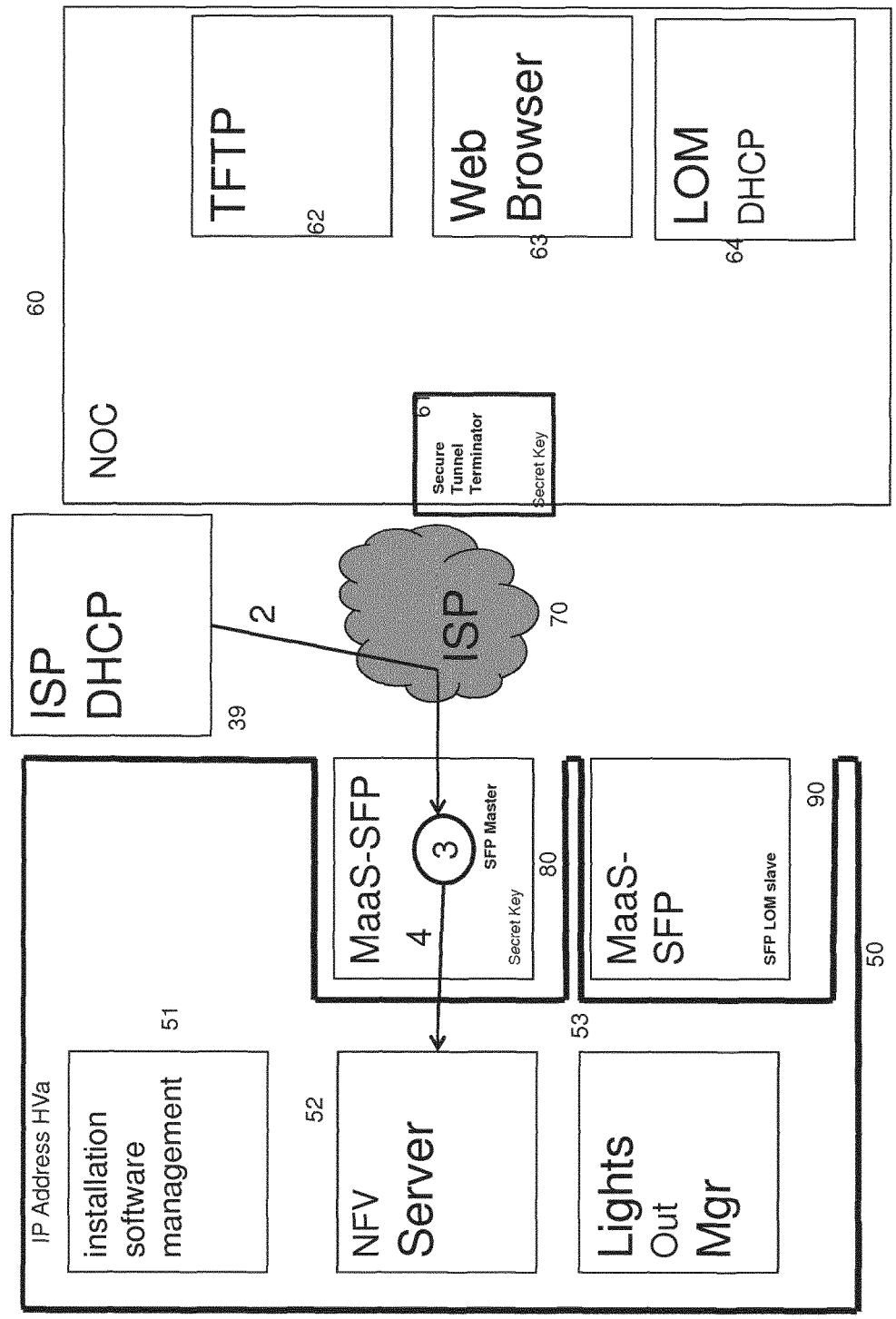
Figure 3A:
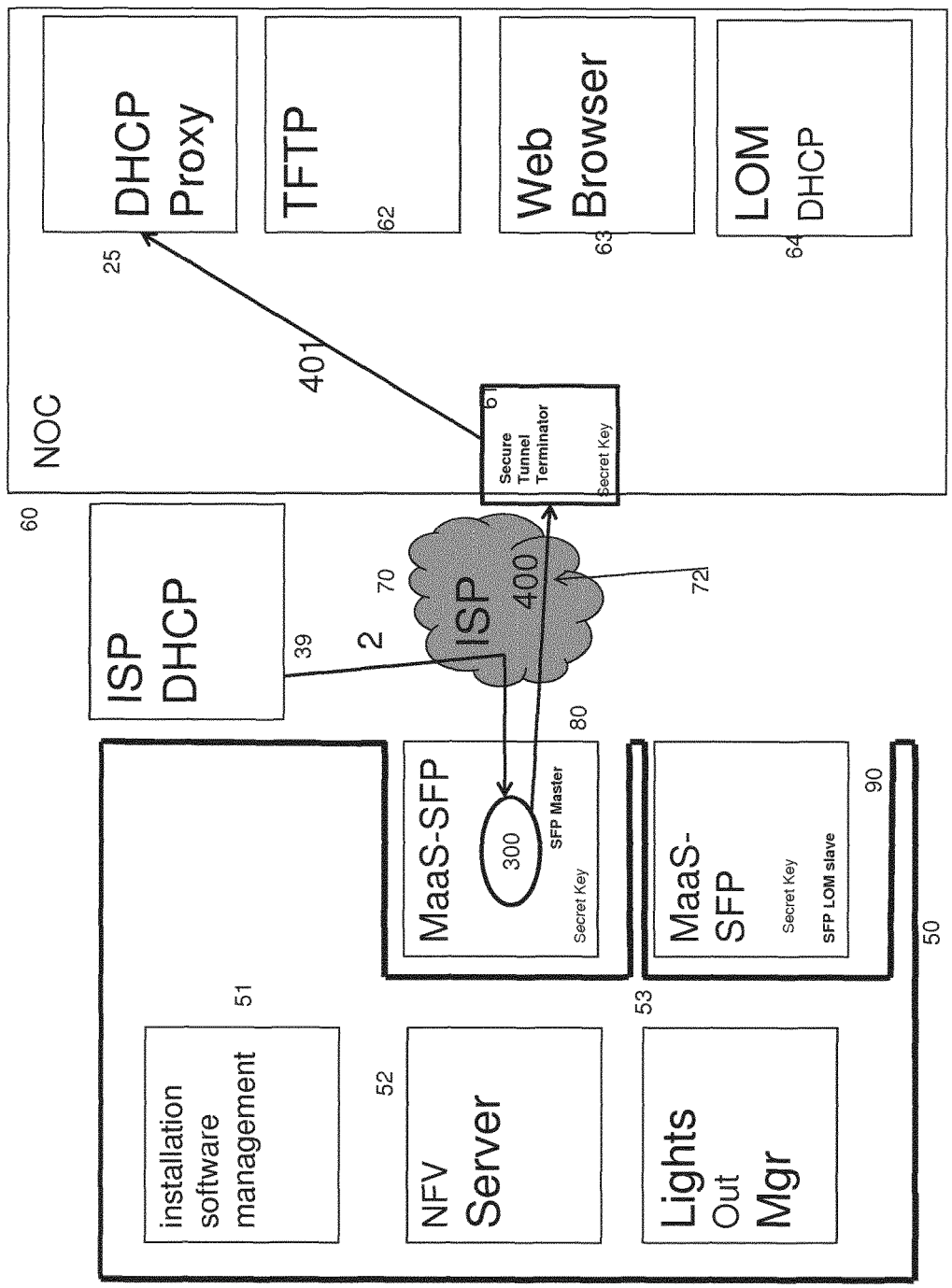
FIGS. 3A and 3B illustrate an alternative to the steps illustrated in FIG. 3

In FIG. 3, the ISP's DHCP server 39 responds (step 2) with a DHCP response packet containing the IP address for the server 50 and the default gateway address.

The MaaS-SFP 80 intercepts the DHCP response 2 (step 3) and rewrites its TFTP options with the address of the TFTP server 62, and the boot file name. These items are "burned into" the SmartSFP 80 prior to it being shipped to the customer. It may also police other DHCP fields considered to be a security risk.

The MaaS-SFP forwards the modified DHCP response packet to the server 50 BIOS 52 (step 4).

Figure 3B:
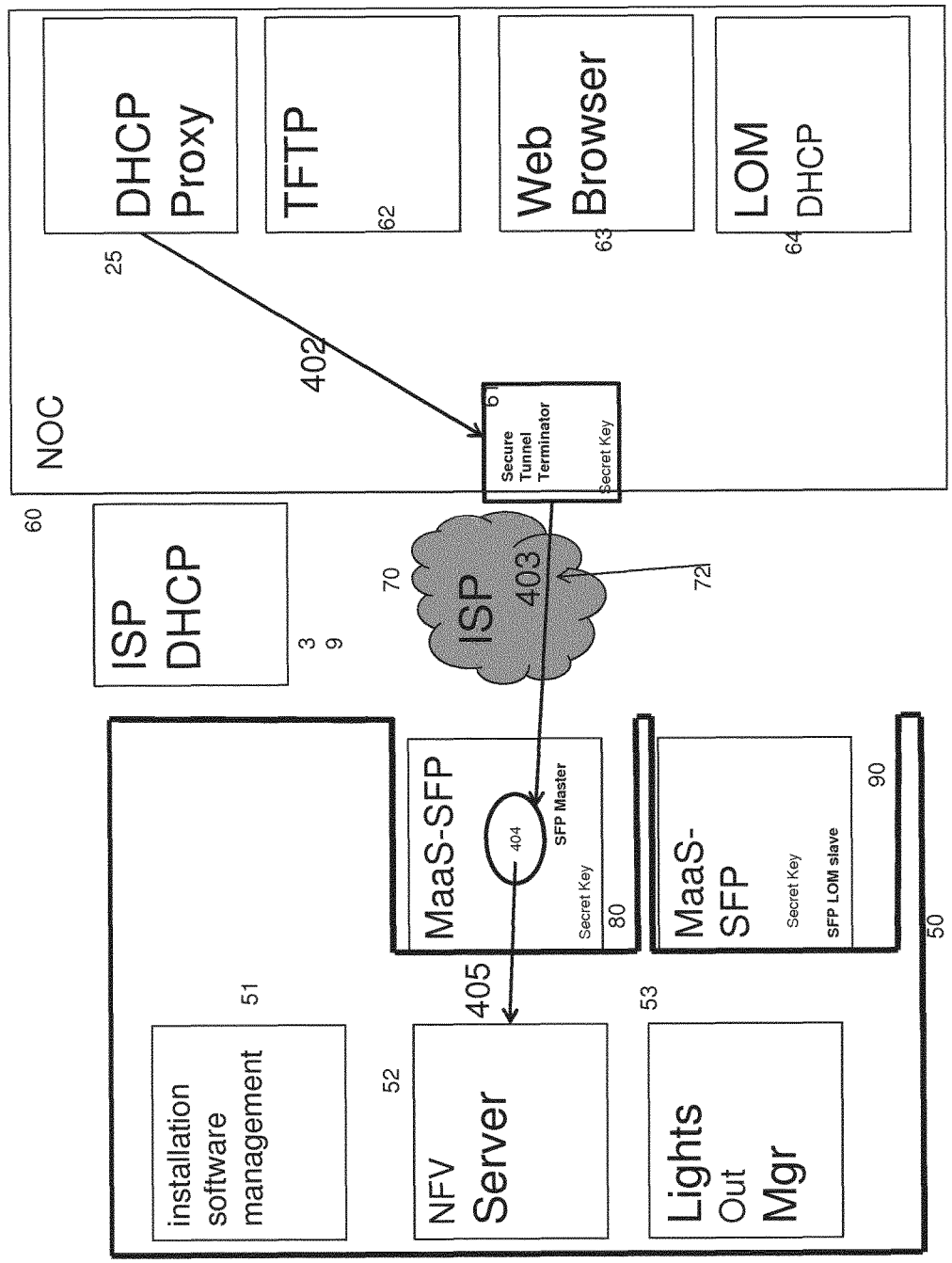

Some underlying SmartSFP technologies may not be able to modify packet contents "on the fly" as described above. An alternative method is depicted in FIGS. 3A and 3B that avoids this. In this the MaasSFP redirects the DHCP responses 2 (step 300) into the secure tunnel 72 towards the DHCP Proxy 25 in the network operations center 60 (step 400), the IP address of the DHCP having been "burned into" the MaaSSFP 80 prior to shipping to the customer site. The MaaS-SFP will identify the source IP address of the tunnel 72 from the ISP's DHCP response 2.

The secure tunnel terminator 61 at the NOC 60 removes the DHCP response 400 from the secure tunnel 72 and sends it to the DHCP proxy 25 (step 401). The secure tunnel terminator 61 records the MAC address—IP address mapping of the encapsulated DHCP packet 400 it has received.

The alternative procedure continues as depicted in FIG. 3B (steps 402-405). The DHCP proxy 25 writes the filename details of the TFTP server 62 and the boot filename in the DHCP response 401 received from the ISP's DHCP server 39 and returns it to the secure tunnel terminator 61 (step 402). The DHCP proxy can customise the boot file name using the MAC address of the server 50 (which is detected as the source of the incoming message 400) as the unique identifier of the customer.

In step 403 the secure tunnel terminator 61 encapsulates the TFTP response 402 from the DHCP proxy 25 and forwards it to the MaaS-SFP master 80 using the MAC address/IP address mapping determined when the packet was received in Step 400.

In step 404 the MaaS-SFP master 80 de-encapsulates the DHCP response 403 from the DHCP proxy 25 received through the secure tunnel 72.

In step 405 the MaaS-SFP master 80 forwards the de-encapsulated DHCP response 402 to the BIOS 52.

Figure 4:
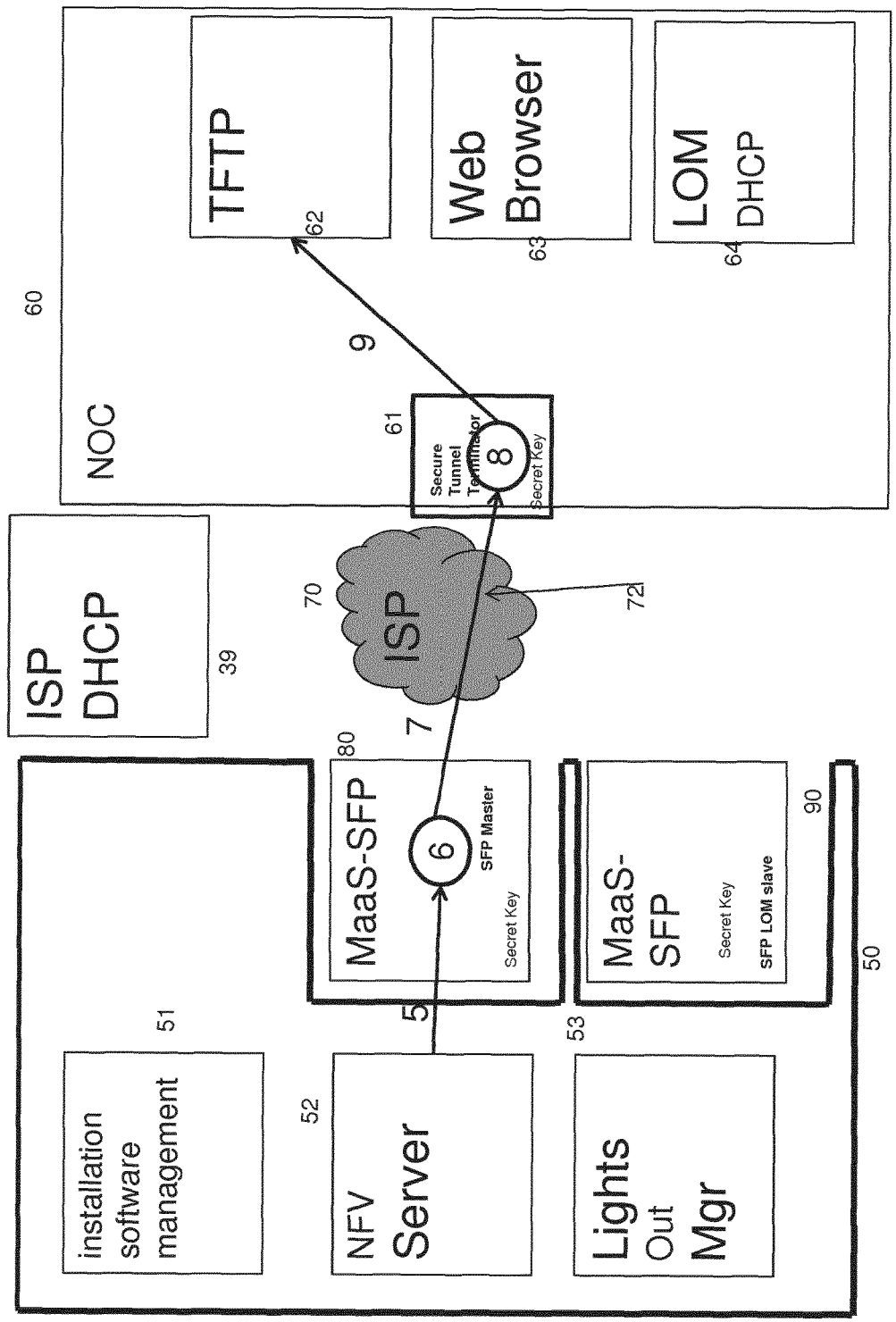

Thus, either through the process of FIG. 3 or that of FIGS. 3A and 3B, the de-encapsulated DHCP response is delivered to the BIOS 52 (step 4 or 405). As shown in FIG. 4, the BIOS 52 next sends a TFTP request for the boot file to the MaaS-SFP master 80 (step 5). The MaaS-SFP 80 encapsulates the TFTP request (step 60 and forwards it over the network 70 to the secure tunnel terminator 61 at the network operating center 60 (step 7). The secure tunnel terminator 61 de-encapsulates the TFTP request (step 8), notes the IP address-MAC address mapping of the server for future use, and forwards the request to the TFTP server 62 (step 9).

Figure 5:
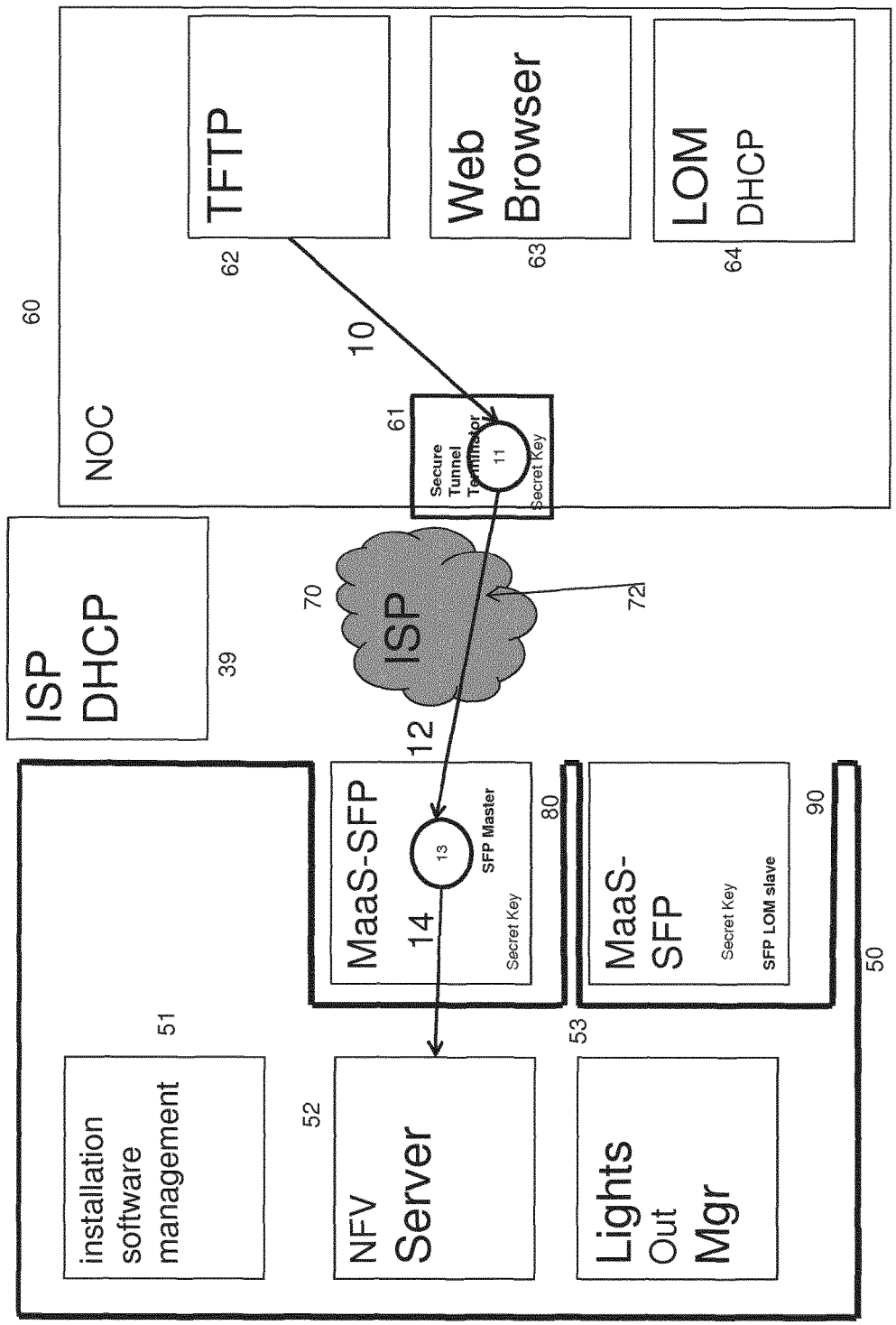

In FIG. 5, the TFTP server 62 sends the boot file as several packets to the secure tunnel terminator 61 (step 10). The secure tunnel terminator encapsulates the TFTP packets (step 11), and forwards them to the MaaS-SFP master 80 (step 12). The MaaS-SFP master de-encapsulates the TFTP packets (step 13) and forwards them to the BIOS 52 (step 14). The BIOS can then run the boot file, to install the Installation software on the server 50 with a unique IP address.

It is now possible for a network operator 60 to communicate with the installed software 51. The IP address of the installation software is known to the network operation center 60 because it was explicitly configured in the boot file sent to the BIOS 52. The secure tunnel terminator 61 is pre-configured to route the IP address HVa via the secure tunnel 72 to the IP address used by the installation software manager 51 & MaaS-SFP 80. Since the server IP address is unknown, the configured mapping will use the known MAC address of the server 50 combined with the learnt-MAC-address-to-IP-address mapping learnt in Step 8.

Figure 6:
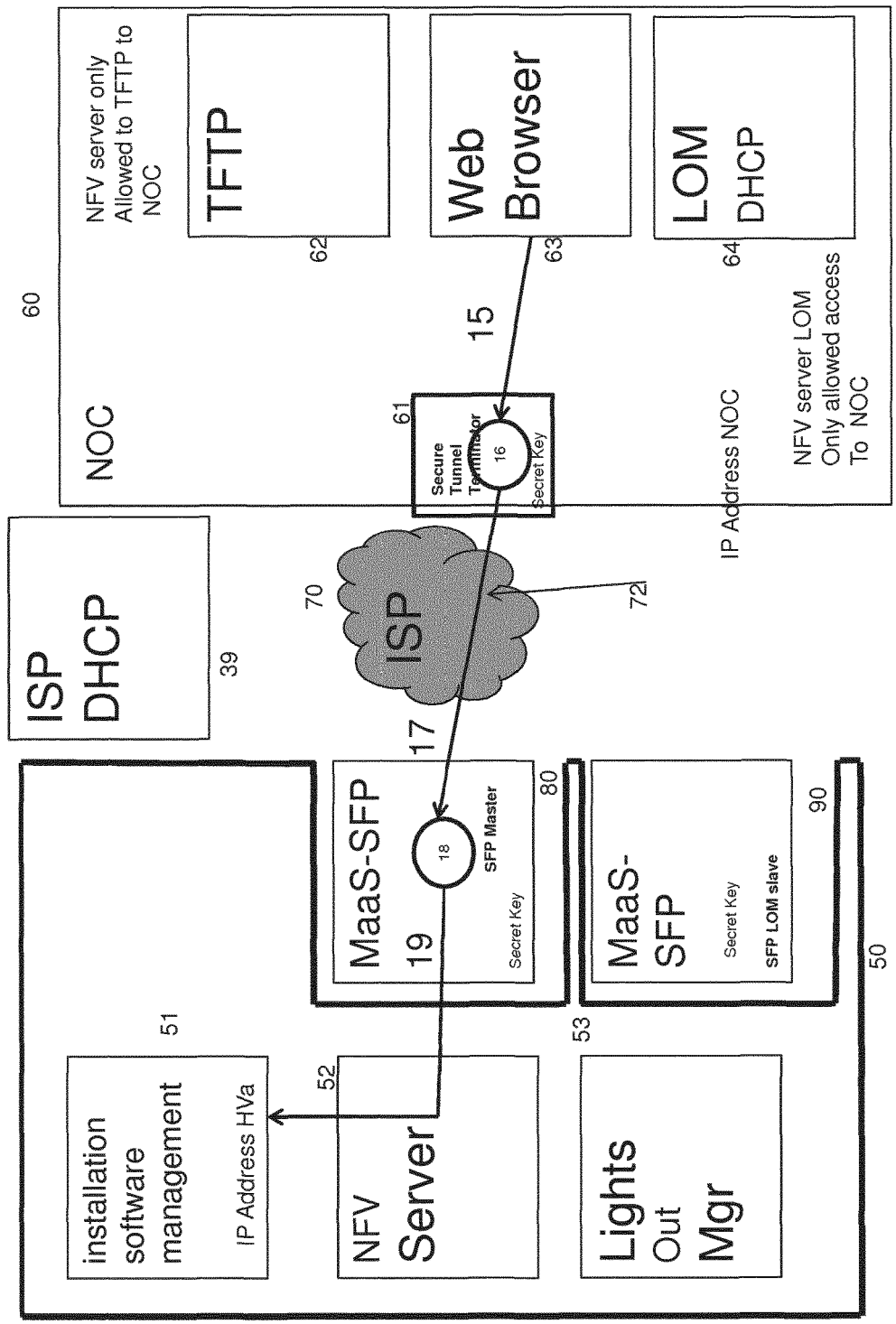

As shown in FIG. 6, installation software in the network operations center 60 attempts a TCP connection to the IP address HVa 51 (Steps 15 to 19), by sending the installation software to the secure tunnel terminator 61 (step 15). The secure tunnel terminator routes packets addressed to "HVa" to the IP address of the server 50 using the pre-configured HVa—server MAC address mapping combined with the learnt Server IP Address—MAC address mapping from Step 8 (step 16). The TCP packets are sent to the MaaS-SFP master 80 (step 17), which de-encapsulates the TCP packets (step 18) and forwards them to the Installation software 51 on the server 50 (step 19).

TCP packets are returned to the Web Browser by symmetrical means. The Installation software could have been pre-configured with a default route learnt via the DHCP response received in Step 4 or 405 (FIG. 3 or 3B). Alternatively the DHCP Proxy could have built this into the boot file configuration on the fly after Step 401. Alternatively the Installation software 51 could transmit a request for its IP address configuration & default route using DHCP using a routing method similar to Steps 3,4 & 401 but the MaaS-SFP master 80 needs to be able to differentiate the original DHCP request (Step 1) from the Installation software DHCP request. This can be by noting the different MAC addresses used for the original DHCP and the different MAC address (pre-configured in the boot file) of the Installation software. Installation software could be configured to use a specific range of MAC addresses. Alternatively, a DHCP field such as a vendor extension can be, set to identify it as a request from the Installation software 51.

Figure 7:
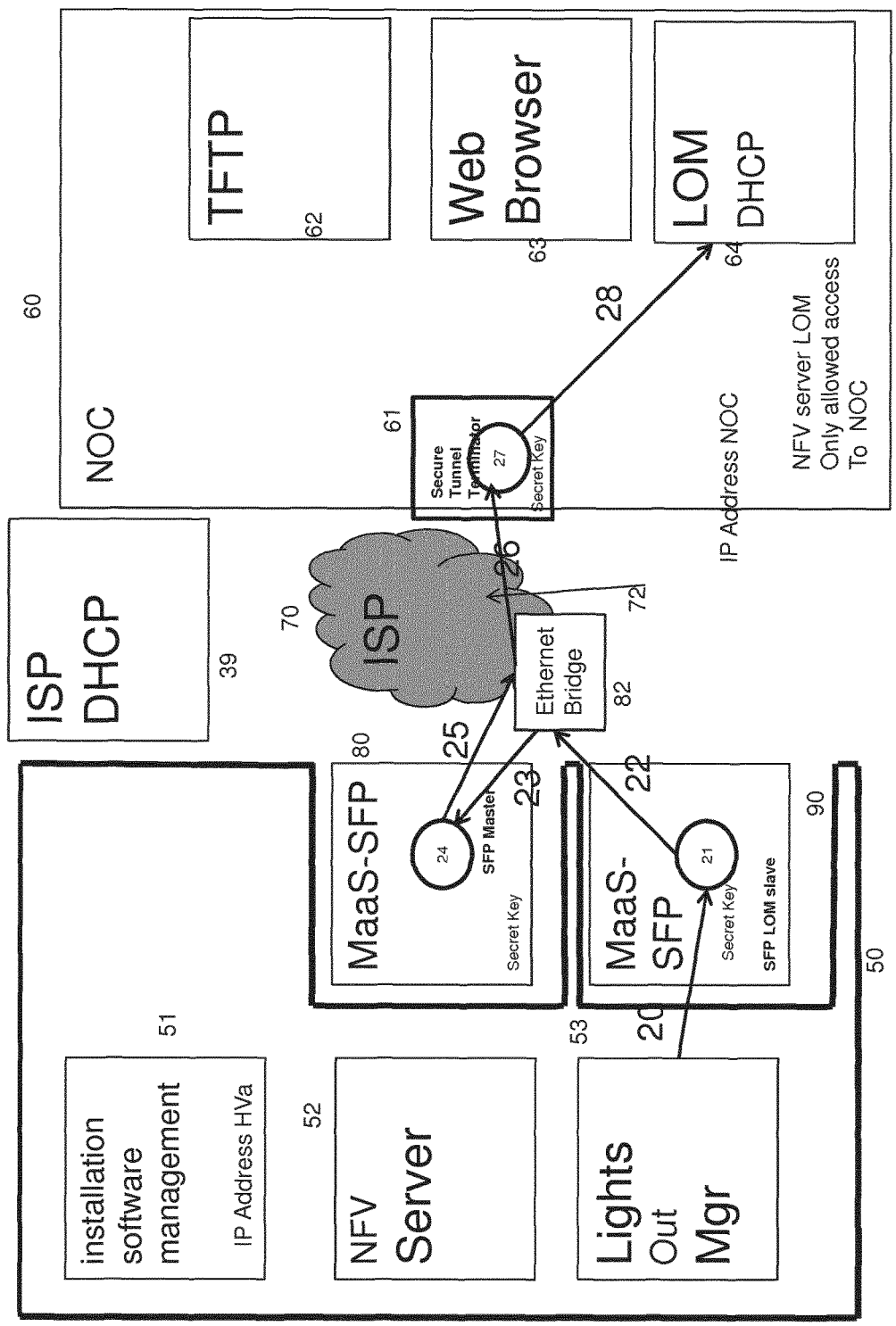
FIGS. 7 to 9 illustrate steps in configuring an ancillary function of the server following the initial configuration process of FIGS. 2 to 6
Figure 8:
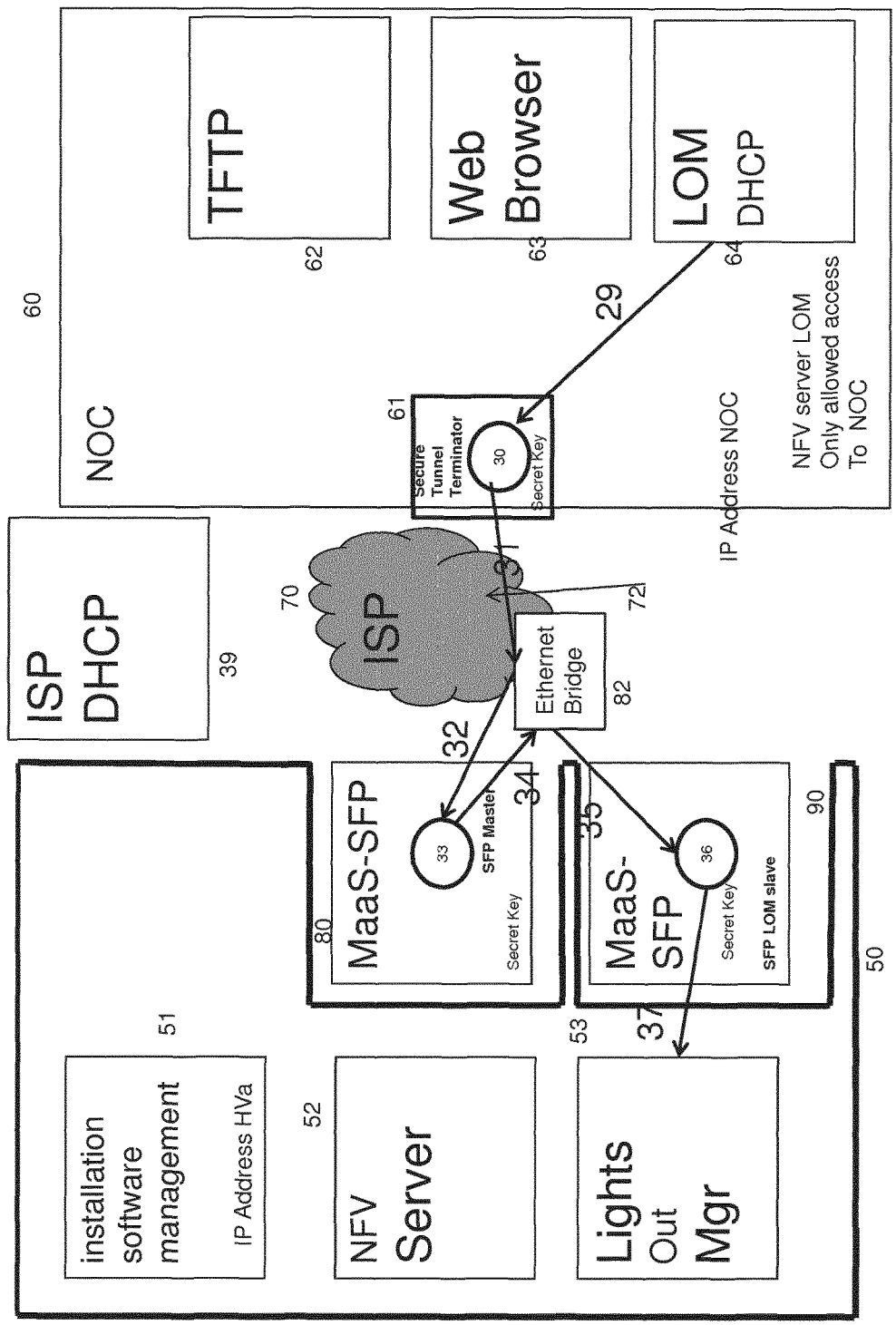
Figure 9:
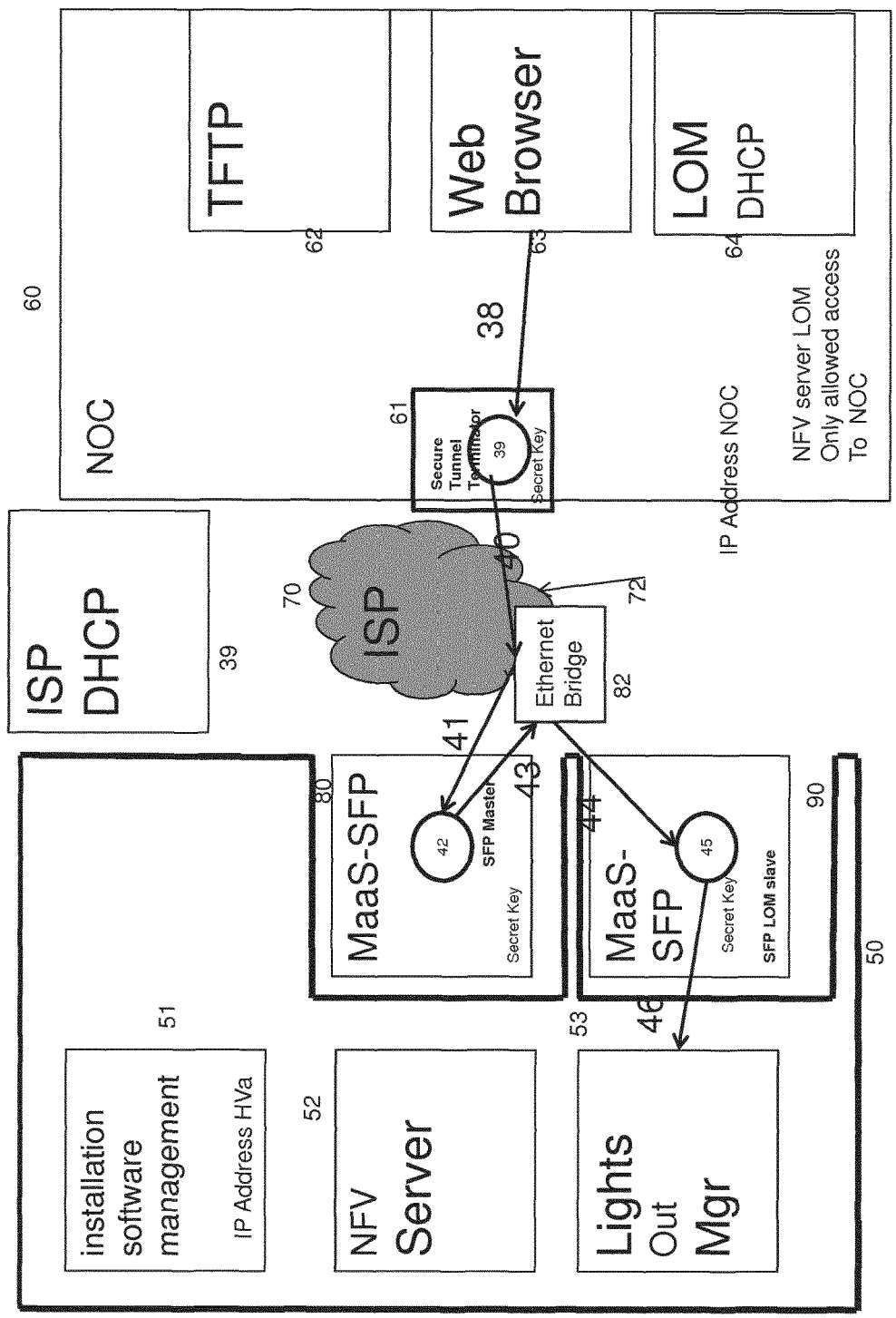
Figure 10:
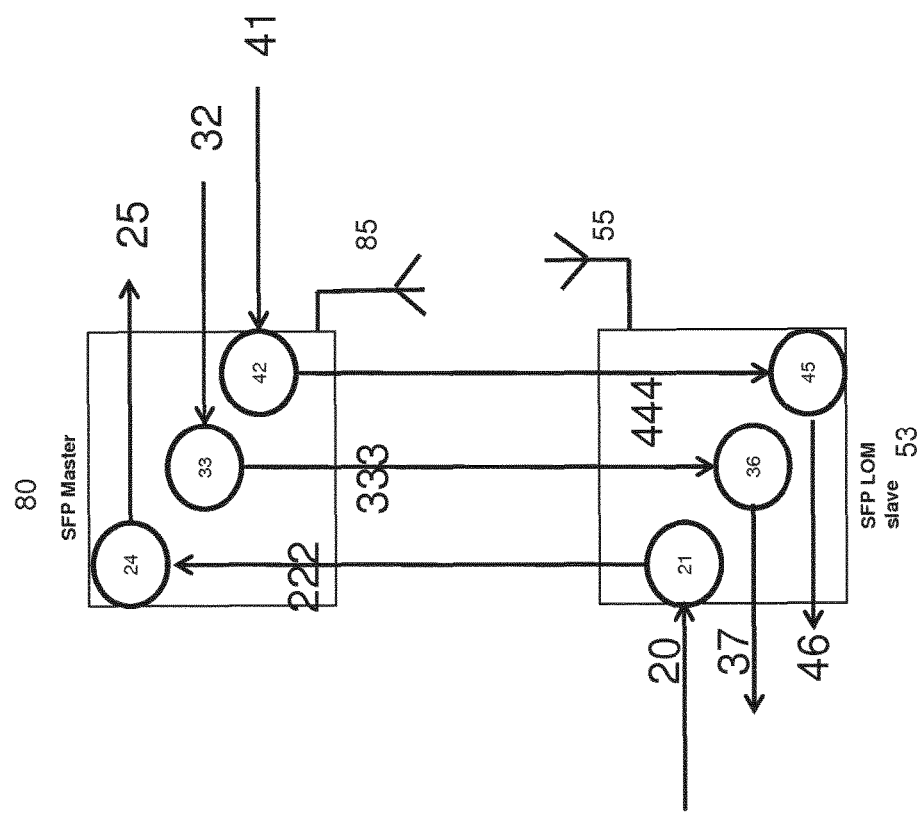
FIG. 10 illustrates an alternative configuration for use in a variant of the steps of FIGS. 7, 8 and 9
Figures 11, 12:
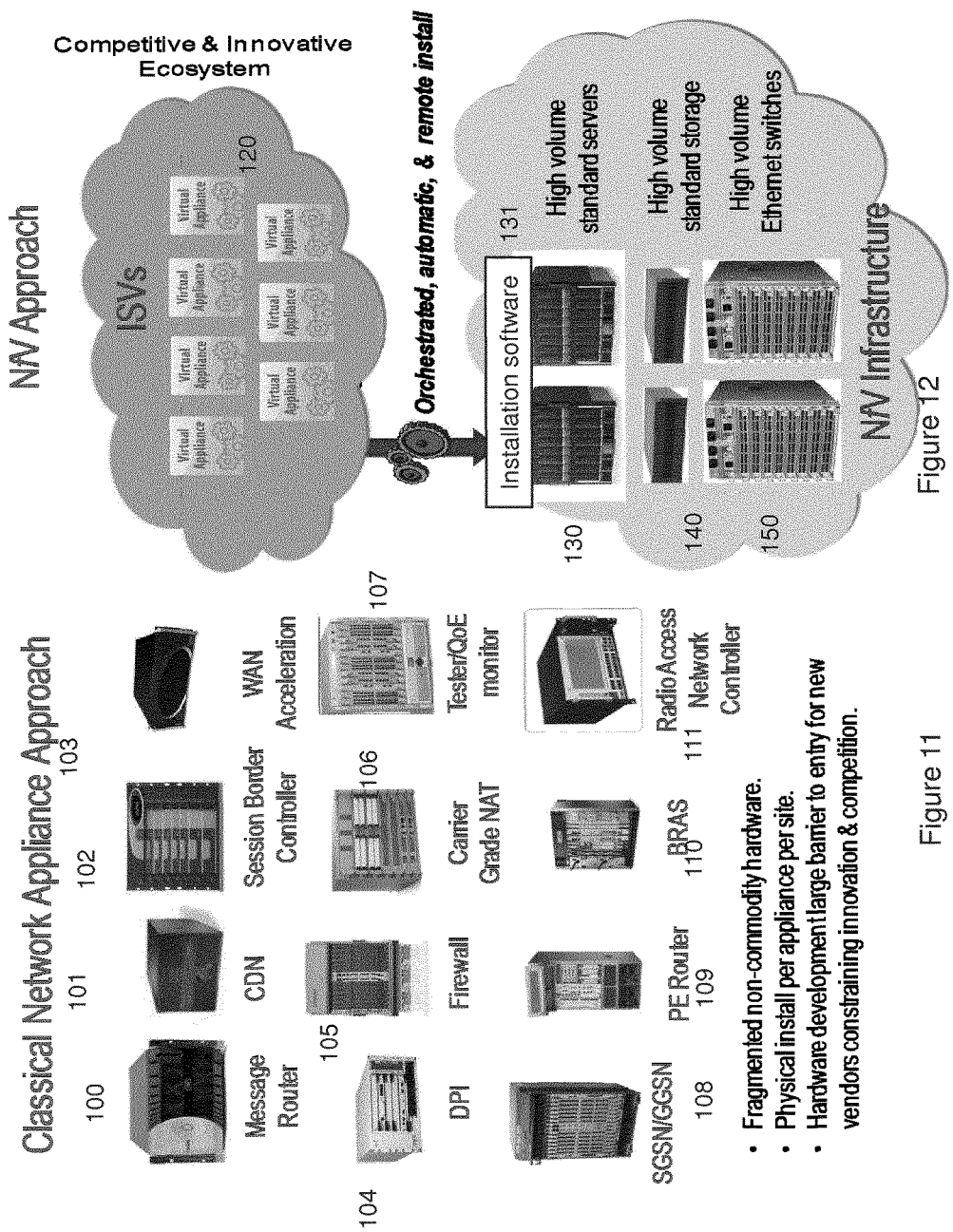
FIGS. 11 and 12 illustrate two prior art approaches, and have already been discussed; more specifically.

FIGS. 7, 8 and 9 illustrate how the process may also be used to configure ancillary functions before or after the installation software manager has been installed. FIG. 10 illustrates a variant of the process. For the sake of example the ancillary function to be installed is a "Lights Out Manager" (LOM) 53, requiring a separate pluggable device (SFP) 90 inserted in a second Ethernet port 57 and slaved to the first SFP 80, and a separate network configuration. It can use DHCP to obtain its IP networking details, using a process depicted in FIGS. 7 and 8.

As shown in FIG. 7, the LOM 53 initially broadcasts its DHCP address (step 20). The Ethernet ports of the master SFP 80 and slave SFP 90 are interconnected by setting up an Ethernet bridge 82.

The MaaS-SFP slave 90 encapsulates the DHCP request in a secure tunnel using its burned-in secure key (step 21). The slave MaaS-SFP 90 is preconfigured to send its secure tunnel to the MAC address of the server 50 (which is burned in and known in advance). The DHCP request is sent to the MaaS-SFP 80 via the Ethernet Bridge (steps 22, 23), Alternatively, if the MAC address of the Server is not known in advance the MaaS-SFP slave 90 can broadcast the DHCP request over the ethernet bridge 82, and it is intercepted by the master SFP 80 On receiving an encapsulated (tunneled) DHCP request, the MaaS-SFP master 80 de-encapsulates it (step 24). (A broadcast DHCP received from the slave SFP does not require de-encapsulation) The DHCP request is next encapsulated (or re-encapsulated) for transmission in the secure tunnel 72 to the Network Operating center 60. The DHCP request packet is then forwarded to the network operating center 60 via the DHCP tunnel 72 via the Ethernet Bridge 82 (step 25) and the communications network 70. (Step 26) to the secure tunnel terminator 61 in the network operations center 60. The secure tunnel terminator 61 will differentiate between DHCP request packets for Step 401 and DHCP request packets for Step 28 either by pre-configuration with the known MAC addresses of the LOM 53 and Server 50 or by vendor-specific extensions to the DHCP packets.

The Secure tunnel terminator 61 de-encapsulates the DHCP request (step 27), and records the MAC address of the Lights Out manager 53 and IP address of the secure-tunnel mapping, before forwarding the DHCP request to the Lights Out Management server 64 in the network management center 60 (step 28).

FIG. 8 depicts a process by which the LOM DHCP server 64, having received the DHCP request 28, may be configured with appropriate security policies to reject DHCP requests not appearing to come from the Lights Out Manager 53. The MAC address of the LOM 53 may be known in advance. The LOM DHCP server 64 sends a DHCP response 29 to the secure tunnel terminator 61. The Secure tunnel terminator 61 encapsulates the DHCP request and forwards it to the IP address of the server 50 using the IP-address MAC mapping learnt in Step 27 (step 30). This packet is forwarded over the secure tunnel 72 through the network 70 ISP (step 31) to the Ethernet bridge 82, which forwards it to the MaaS-SFP master 80 (step 32). The master MaaS-SFP 80 de-encapsulates the DHCP response packet (step 33). If secure tunnel is used to between the MaaS-SFP master 80 and the MaaS-SFP slave 90 the master also re-encapsulates the packet.

The MaaS-SFP master then forwards the packet to the MaaS-SFP slave 90 by way of the Ethernet bridge 82 (steps 34, 35), which de-encapsulates the DHCP response (step 36) if a secure tunnel has been used, and then forwards the packet to the Light Out manager (step 37), so that the Lights Out Manager can then configure itself to have the IP Address specified by the Lights Out manager server system 64.

The Network operation Center 60 can now connect to the LOM 53 using a web browser 63 to manage the server hardware. The IP address of the LOM is known to the browser as it was configured from the LOM DHCP database 64 in the process depicted in FIG. 8. In order to operate, the web browser first sets up a TCP session to the LOM IP address, (step 38). The secure tunnel terminator 61 in the Network operation Center 60 encapsulates the packets and transmits them to the lights out manager 53 by way of the communications network 70, Ethernet bridge 82, master SFP 80, and slave SFP 90 (steps 39, 40, 41, 42, 43, 44, 45, 46) in the same way as the configuration data is transmitted (steps 30-37, see FIG. 8), using the mapping of the MAC address of the LOM 53 to the address of the NFV Server 52 learnt in Step 27 combined with the preconfigured LOM IP Address (LOMa) and LOM MAC address. That is to say, the destination of the tunnel is determined by mapping the LOM address to that of the LOM MAC, and to the IP address of the server 50.

In the alternative arrangement shown in FIG. 10, a paired wireless connection 55/85 between the MaaS-SFP master 80 and MaaS-SFP slave 90 replaces the ethernet bridge 82 to send the DHCP request 222 from the slave to the master (replacing steps 22, 23), the responses 333, 444 from the master to the slave (replacing steps 34,35: 43, 44). The paired wireless arrangement is similar to the way in which a wireless keyboard or mouse can be pre-paired to a computer.

The invention claimed is:

1. A method of installing an application on a configurable server device, the method comprising the steps of:
    installing, in the configurable server device, an intermediate communication interface device;
    initiating and mediating, from the intermediate communications interface device, a tunneled network connection through a telecommunications network to a remote network operating center, the connection being independent of the configurable server device,
    receiving, at the configurable server, configuration data downloaded from a program provisioning server hosted by the network operating center, and
    installing the application by configuring the server device in accordance with the configuration data, wherein:
    the intermediate communications interface device is configured, prior to coupling to the configurable server device, such that on coupling to the configurable server device it transmits boot-up instructions to the configurable server device, and modifies responses received from the configurable server device in response to said boot-up instruction, to generate an instruction to be directed to the program provisioning server to obtain a unique network address specific to the network operating center;
    the intermediate communications interface device is embodied as one or more pluggable devices;
    separate applications are mediated through separate respective pluggable devices, in communication with each other; and
    the pluggable devices communicate with each other through a paired wireless connection.

2. A method according to claim 1, wherein the pluggable devices communicate with each other through an Ethernet bridge.

3. A method according to claim 1, wherein communication between the paired devices is through a secure tunneled connection.

4. A method according to claim 1, wherein the program provisioning server hosted by the network operating center operates on a dynamic host configuration protocol (DHCP).

5. A method according to claim 4, wherein boot files are retrieved by the configurable server from a Trivial File Transfer Protocol (TFTP) Server forming part of the program provisioning server.

6. A method according to claim 5, wherein the boot file is accessible to a plurality of configurable servers, and is customized to the respective network address of each configurable server.

7. A communications interface device configured to be connected to a configurable server device and a telecommunications network and to initiate and mediate a tunneled network connection between the server device and a program provisioning server at a remote part of the telecommunications network, wherein the communications interface device is configured for coupling to a configurable server device and to transmit boot-up instructions to the configurable server device to which it is coupled, and to modify responses received from the configurable server device in response to said boot-up instruction, to generate an instruction, to be transmitted by a routing independent of the configurable server device, to a programming provisioning server hosted by the network operating center to obtain a network address;
  wherein the communications interface device is a pluggable device;
  wherein the communications interface device is arranged to mediate installation and operation of a first function on the server device by connection with a program provisioning server, and to communicate with a second such pluggable device installed on the server device to mediate installation and operation on the server device of a second function from the, or another, program provisioning server; and
  wherein the communications interface device is arranged to communicate with the second pluggable device through a paired wireless connection.

8. A communications interface device according to claim 7, arranged to communicate with the second pluggable device through an Ethernet bridge.

9. A method of installing an application on a configurable server device, the method comprising the steps of:
  pre-configuring an intermediate communications interface device, such that, on subsequent coupling to a configurable server device, the intermediate communications interface device will transmit boot-up instructions to the configurable server device;
  coupling the intermediate communications interface device which has been pre-configured, in the configurable server device, so that it transmits the boot-up instructions to the configurable server device;
  initiating and mediating, from the intermediate communications interface device, a tunneled network connection through a telecommunications network to a remote network operating center, the connection being independent of the configurable server device;
  at the intermediate communications interface device, receiving responses from the configurable server device in response to said boot-up instruction, and modifying said responses to generate an instruction to be directed to a program provisioning server hosted by the network operating center to obtain a unique network address specific to the network operating center;
  receiving, at the configurable server device, configuration data downloaded from the program provisioning server; and
  installing the application by configuring the configurable server device in accordance with the configuration data.

10. A method according to claim 9, wherein:
  the intermediate communications interface device include multiple pluggable devices;
  separate applications are mediated through separate respective pluggable devices, in communication with each other; and
  the pluggable devices communicate with each other through a paired wireless connection.

11. A method according to claim 9, wherein the intermediate communications interface device is embodied as one or more pluggable devices.

12. A method according to claim 11, wherein separate applications are mediated through separate respective pluggable devices, in communication with each other.

13. A method according to claim 12, wherein the pluggable devices communicate with each other through an Ethernet bridge.

14. A method according to claim 12, wherein the pluggable devices communicate with each other through a paired wireless connection.

15. A method according to claim 12, wherein communication between the paired devices is through a secure tunneled connection.

16. A method according to claim 9, wherein the program provisioning server hosted by the network operating center operates on a dynamic host configuration protocol (DHCP).

17. A method according to claim 16, wherein boot files are retrieved by the configurable server from a Trivial File Transfer Protocol (TFTP) Server forming part of the program provisioning server.

18. A method according to claim 17, wherein the boot file is accessible to a plurality of configurable servers, and is customized to the respective network address of each configurable server.

* * * * *